(12) United States Patent
Hurt et al.

(10) Patent No.: US 6,572,280 B2
(45) Date of Patent: Jun. 3, 2003

(54) OPTICAL TRANSMITTING/RECEIVING MODULE INCLUDING AN INTERNAL OPTICAL WAVEGUIDE

(75) Inventors: Hans Hurt, Regensburg (DE); Gustav Müller, Falkensee (DE); Martin Weigert, Berlin (DE); Josef Wittl, Parsberg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/198,573

(22) Filed: Jul. 18, 2002

(65) Prior Publication Data

US 2003/0007753 A1 Jan. 9, 2003

Related U.S. Application Data

(63) Continuation of application No. PCT/DE01/00185, filed on Jan. 16, 2001.

(30) Foreign Application Priority Data

Jan. 18, 2000 (DE) .......................................... 100 01 875

(51) Int. Cl.[7] .................................................. G02B 6/36
(52) U.S. Cl. .............................. 385/92; 385/14; 385/88; 385/89; 385/90; 385/91
(58) Field of Search ............................... 385/14, 49, 88, 385/89, 90, 91, 92

(56) References Cited

U.S. PATENT DOCUMENTS 4,281,891 A   8/1981  Shinohara et al.
5,032,898 A   7/1991  Bowen et al.
5,101,465 A * 3/1992  Murphy .................... 385/88
5,631,990 A * 5/1997  Hashizume ................ 385/92
5,687,270 A  11/1997  Takizawa
5,812,716 A * 9/1998  Ohishi ...................... 385/92
5,960,141 A   9/1999  Sasaki et al.
6,147,817 A * 11/2000 Hashizume ................ 359/819
6,290,402 B1 * 9/2001  Shishikura et al. .......... 385/88
6,309,566 B1 * 10/2001 Muller et al. .............. 264/1.25

FOREIGN PATENT DOCUMENTS

DE   39 32 579 A1   4/1991
DE   197 11 138 A1  9/1998
EP   0 278 507 A2   8/1988
JP   57 138 608     8/1982
JP   02 151 819     6/1990

* cited by examiner

Primary Examiner—Akm E. Ullah
Assistant Examiner—Jennifer Doan
(74) Attorney, Agent, or Firm—Laurence A. Greenberg; Werner H. Stemer; Ralph E. Locher

(57) ABSTRACT

A module essentially includes a module housing, into which is introduced a lead frame. An electro-optical transducer is mounted on the lead frame. The interior of the module housing is filled with a transparent potting compound. A plug receptacle part is moulded onto the outer housing wall and has a defined outer contour. Situated in the interior of the plug receptacle part is an optical waveguide piece, which proceeding from the surroundings of an outer area of the plug receptacle part, extends through the interior of the plug receptacle part and through a housing opening right into the housing interior. The optical waveguide piece is optically coupled to the electro-optical transducer. An optical waveguide plug interacting with the module has a sleeve-shaped plug section corresponding to the plug receptacle part.

6 Claims, 2 Drawing Sheets

OPTICAL TRANSMITTING/RECEIVING MODULE INCLUDING AN INTERNAL OPTICAL WAVEGUIDE

CROSS-REFERENCE TO RELATED APPLICATION

This application is a continuation of copending International Application No. PCT/DE01/00185, filed Jan. 16, 2001, which designated the United States and was not published in English.

BACKGROUND OF THE INVENTION

Field of the Invention

The present invention relates to an optical transmitting and/or receiving module and to methods for producing the module. In addition, the present invention relates to an optical waveguide plug which interacts with the module.

The present invention thus lies in the field of the production of optical or electro-optical assemblies or modules which usually have a plug receptacle for the connection and for the optical coupling of suitable coupling partners, for example optical waveguides. Other optical or electro-optical elements—e.g. for purposes of direct electrical isolations to a further electro-optical module—are also conceivable as coupling partners. In order to convert electrical signals into optical signals or to convert optical signals into electrical signals, such modules have electro-optical transducers having a light-radiating (transmitter) or light-sensitive (receiver) region. Such a light-radiating or light-sensitive region is also referred to as optically active zone in the context of the present invention. The electro-optical transducer is mounted on a section of a lead frame which, on this section, is surrounded by a moulded body made of a transparent potting compound. The potting compound is enclosed by a module housing having a housing opening for the passage of an optical transmitting or receiving radiation beam.

A high coupling efficiency when feeding optical signals into or out of optical waveguides requires not only the electro-optical transformation of the signals, but also a precise coupling of the signal-exporting and/or signal-feeding optical waveguides (coupling partners). Light-emitting diodes (LED) or horizontally radiating laser diodes, for example, are used as transmitters in optical transmission technology. In a manner governed by their design, these diodes often have a large numerical aperture, which requires lenses to be used in order to achieve optical coupling with a high efficiency.

Published German Patent Application DE 197 11 138 A1 discloses an optical transmitting and/or receiving module in which a carrier, such as a lead frame on which an electro-optical transducer is mounted, is surrounded by a mouldable material formed as a moulded body. The moulded body has a functional area, for example, a lens or a stop area, serving for optical coupling.

Furthermore, such optical transmitting and/or receiving modules are also known whose production involves using a casting mould that determines the form and size of the moulded body. After the casting or injection-moulding operation during which the transparent, mouldable material is introduced into the casting mould, the casting mould is retained as a module housing. A plug receptacle part for coupling an optical waveguide plug is then moulded onto this housing at the light entry or exit side. Such a module housing is also known as a cavity as interface (CAI).

In the case of the CAI modules known heretofore, it is disadvantageous with regard to the plug receptacle that plugs having unprotected protruding optical end areas of the optical waveguide have to be used for the connection to optical waveguides. These optical waveguide plugs are therefore usually modified to the effect that the optical end areas of the optical waveguide are protected by a relatively complicated flap mechanism. However, the use of these or other optical waveguide plugs on account of the plug receptacle provided on the module is also additionally impaired by the so-called Kojiri effect or snag effect, which denotes the unintentional damaging of an optical waveguide plug on account of the action of force during the plugging operation (including when carried out improperly). The measures taken to combat this, such as, providing latching mechanisms, providing coding against incorrect plugging, providing ribs on the plug/housing, and setting-back the contacts in the plug housing, are also complex and cannot be reconciled with the requirement for simply and cost-effectively producing an optical waveguide plug.

SUMMARY OF THE INVENTION

It is accordingly an object of the invention to provide an optical transmitting and/or receiving module and a method for producing the module which overcomes the above-mentioned disadvantages of the prior art apparatus and methods of this general type.

In addition, it is an object of the invention to simply and cost effectively produce an optical waveguide plug that can be coupled to the optical module. The optical waveguide of the optical waveguide plug has no unprotected protruding optical end areas.

With the foregoing and other objects in view there is provided, in accordance with the invention, an optical module, including: a lead frame having an end section; an electro-optical transducer mounted on the end section of the lead frame; and a module housing formed with an outer housing wall, an inner cavity defining sides, a first housing opening leading to the cavity, and a second housing opening leading to the cavity. The end section of the lead frame projects through the first housing opening. The second housing opening is for the passage of an optical radiation beam that can be an optical transmitting radiation beam from the electo-optical transducer or a received radiation beam by the electo-optical transducer. The optical module also includes: a plug receptacle part extending outwards near the second housing opening, the plug receptacle part being configured on the outer housing wall; a transparent potting compound; and an optical waveguide piece being optically coupled to the electro-optical transducer. The module housing is moulded in one piece and encloses the cavity on all of the sides of the cavity. The cavity is completely filled with the transparent potting compound. The plug receptacle part has only one edge section fixed to the housing. The edge section runs around the second housing opening and lies in a common plane with the second housing opening. The plug receptacle part is formed with an interior and an outer end area. The optical waveguide piece extends, from the outer end area of the plug receptacle part, through the interior of the plug receptacle part and through the second housing opening into the interior of the module housing.

In accordance with an added feature of the invention, the plug receptacle part is not formed in one piece with the module housing.

In accordance with another feature of the invention, the plug receptable part forms a sleeve-like extension moulded in one piece with the module housing.

Such an optical transmitting and/or receiving module allows for the construction of a relatively simple optical waveguide plug which, unlike the optical waveguide plugs used in the prior art, has an optical waveguide with an internal optical end area that can be fixed relatively simply on the plug receptacle part of the module, and that moreover, can be produced relatively simply and cost-effectively.

With the foregoing and other objects in view there is provided, in accordance with the invention, an optical waveguide plug including: a sleeve-shaped plug section having an inner contour corresponding to the outer contour of the plug receptacle part of the optical module; and an optical waveguide having an end area being optically coupled to the plug-side end area of the optical waveguide piece when in a plugged-together state.

The transmitting and/or receiving module furthermore allows an embodiment which will be described in detail further below and in which the transducer-side end area of the optical waveguide piece is arranged at a short distance in front of the transmitting or receiving area of the electro-optical transducer, so that a converging lens can be dispensed with. However, the invention is not restricted to this embodiment since all that actually matters is an optical coupling. Consequently, it is also possible to provide a larger spatial distance, for example when a reflector element is also provided between the electro-optical transducer and the optical waveguide piece.

Two different method variants are conceivable to produce an optical transmitting and/or receiving module.

A first type of embodiment of a method for producing an optical transmitting and/or receiving module consists in the fact that:

a) an optical waveguide piece is inserted into a housing opening of a module housing in such a way that it projects into the interior of the housing and projects from the housing by predetermined lengths in each case;

b) a plug receptacle part is moulded in such a way that a moulded part with a defined outer contour is moulded onto the outer housing wall and around that part of the optical waveguide piece which projects from the module housing;

c) a lead frame, on which an electro-optical transducer is mounted, is introduced into the interior of the module housing and the electro-optical transducer is positioned in such a way that it is optically coupled to the transducer-side end of the optical waveguide piece; and d) the interior of the module housing is filled with a transparent potting compound.

A second type of embodiment of a method for producing an optical transmitting and/or receiving module consists in the fact that:

a) a housing opening is moulded into a module housing and an extension projecting outwards in a tubular or sleeve-shaped manner with a defined internal diameter is moulded onto the opening edge of the housing opening;

b) a closure moulded piece is formed in such a way that a section of a length of an optical waveguide piece is surrounded by an annular moulded-on portion and the closure moulded piece has, on this section, an external diameter which is slightly smaller than the internal diameter of the extension;

c) the closure moulded piece is introduced with the uncovered section of the optical waveguide piece at the front into the sleeve-shaped extension and the housing opening and is fixed in a position in which the optical waveguide piece projects into the interior of the module housing;

d) a lead frame, on which an electro-optical transducer is mounted, is introduced into the interior of the module housing and the electro-optical transducer is positioned in such a way that it is optically coupled to the transducer-side end of the optical waveguide piece; and e) the interior of the module housing is filled with a transparent potting compound.

Other features which are considered as characteristic for the invention are set forth in the appended claims.

Although the invention is illustrated and described herein as embodied in an optical transmitting/receiving module including an internal optical waveguide, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
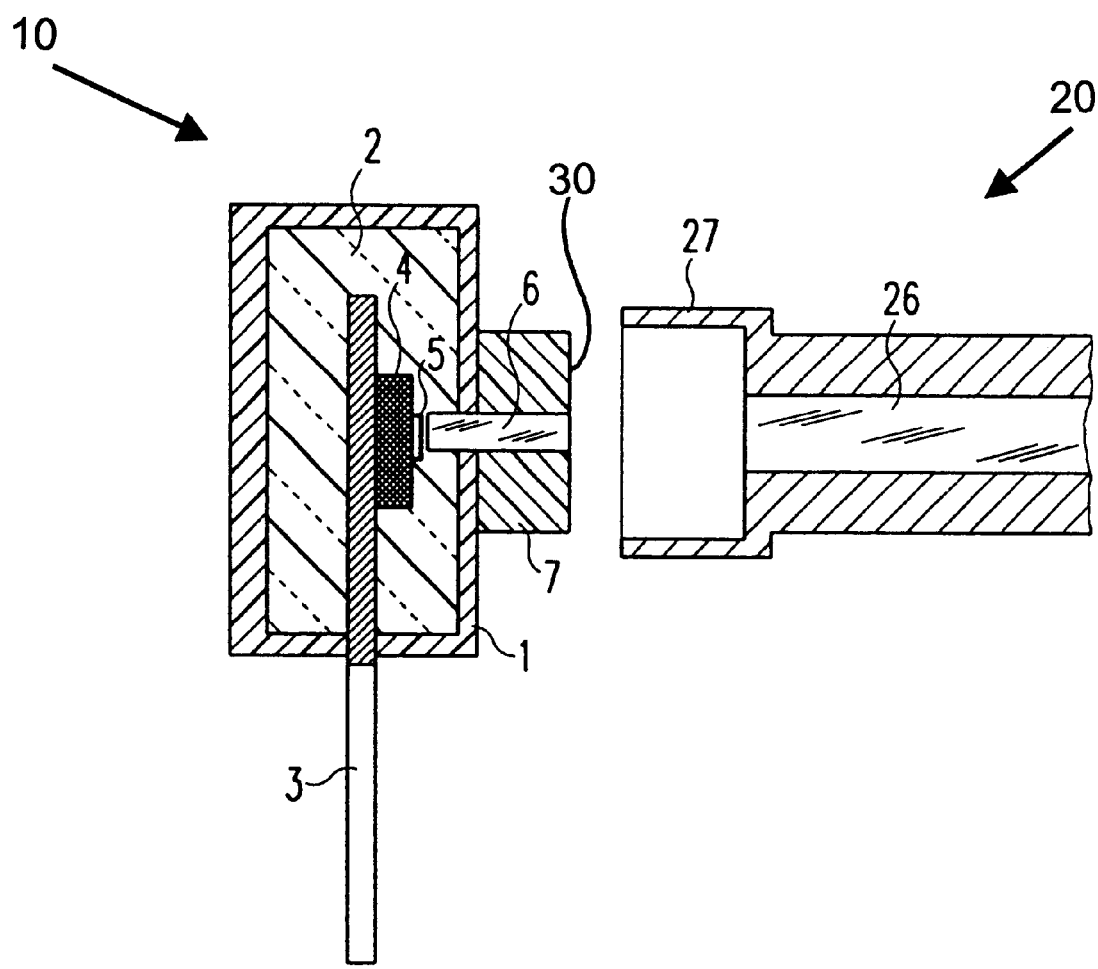
FIG. 1 shows an exemplary embodiment of a transmitting and/or receiving module and an optical waveguide plug interacting with the module.

Referring now to the figures of the drawing in detail and first, particularly, to FIG. 1 thereof, there is shown a simplified, diagrammatic illustration of an exemplary embodiment of an inventive transmitting and/or receiving module 10 and of an optical waveguide plug 20 that interacts with the module. FIG. 1 is a cross-sectional view in the plane of the optical waveguide piece 6 and of the optical waveguide 26.

In the case of this module 10, a moulded body 2 composed of a transparent potting compound is surrounded by a module housing 1 which encloses it on all sides. This module housing 1 may at the same time be the casting mould that is used during the production process for the moulded body 2. The casting mould has been left behind after the casting or injection-moulding operation during which the potting compound is introduced. The module housing 1 has a bottom opening for the entry of a lead frame 3 into the moulded body 2. A plug receptacle for the attachment of an optical waveguide plug is moulded on at a light entry or exit side. Such a module housing is known per se in the prior art as a cavity as interface (CAI).

During the production of the inventive transmitting and/or receiving module, in a manner that is likewise known per se, an initially spatially continuous lead frame is moulded and provided with one or a plurality of optoelectronic transducers 5 on sections provided therefore. Only afterwards and usually between different phases of a casting or injection-moulding operation are individual connecting webs between different connection sections of the lead frame separated. Consequently, in the case of the inventive module, too, a plurality of transducers, i.e. in principle an arbitrary number of transmitters and/or receivers, can be mounted on continuous sections of the lead frame or sections of the lead frame that are separated from one another in the final stage. The module shown in FIG. 1 is not designed as a surfacemountable module, i.e. a module with SMT (Surface Mount Technology) capability. Instead, it is plugged into a circuit board by the external connection pin of the lead frame 3, and the module is connected to electrical conductor tracks on the rear side of the circuit board, or in the case of a multilayer board, the module is connected to conductor tracks of an inner metallization plane. However, it is equally possible to design a module with SMT capability in the case of which the electrical connection sections of the lead frame are routed out from the module housing in such a way that they have connection sections lying in a common mounting plane, so that they can be soldered on a board using a SMT method.

In the present exemplary embodiment shown in FIG. 1, an electro-optical transducer 5, that is to say a transmitter such as a semiconductor laser, or a receiver such as a semiconductor photodiode, is mounted on a submount 4 in a suitable electrically conductive manner, such as, for example, by using conductive paste or the like. The submount 4 is fixed on a section of the lead frame 3 that is provided therefore.

Further measures of electrical contact-connection, for instance, an additional bonding wire connection, are not illustrated for the sake of simplicity of the illustration.

The module 10 in accordance with the exemplary embodiment of FIG. 1 is designed as a so-called sidelooker, i.e. the beam direction of the radiation beam that is coupled in or out is parallel to the plane of the mounting board (not illustrated).

The plug receptacle constitutes an essential aspect of the inventive module 10. The plug receptacle essentially includes a plug receptacle part 7 and an optical waveguide piece 6 moulded into the plug receptacle part 7. In this case, the optical waveguide piece 6 runs from an outer end area 30 of the plug receptacle part 7 centrally through the interior of the plug receptacle part 7 and through an opening in the module housing 1 right into the interior of the moulded body 2. The transducer-side end of the optical waveguide piece 6 is arranged at a short distance from the transmitting or receiving area of the electro-optical transducer 5. As a result, an additional converging lens can advantageously be dispensed with. This is not essential to the present invention, however. A larger distance between the electro-optical transducer 5 and the transducer-side end area of the optical waveguide piece 6 may likewise be provided, in particular in the cases in which a transmitting or receiving radiation beam is intended to be deflected within the moulded body 2 for instance by a suitable reflector element. In these cases, it may be desirable or necessary to provide an additional converging lens at the connecting area between the moulded body 2 and the optical waveguide piece 6.

The plug-side end of the optical waveguide piece 6 is preferably led right up to the end area of the plug receptacle part 7, so that it is flush with the end area. However, it can also be set back slightly into the interior of the plug receptacle part 7.

The plug receptacle part 7 has a defined outer contour which corresponds to the inner contour of a sleeve-shaped plug section 27 of an optical waveguide plug. The outer contour of the plug receptacle part 7 may be circular, for example. The external diameter of the plug receptacle part 7 and the internal diameter of the sleeve-shaped plug section 27 of the optical waveguide plug 20 are chosen in such a way that the sleeve-shaped section 27 can be pushed over the plug receptacle part 7. In addition, suitable fixing elements, such as latching-in elements or bayonet-like closure elements, can be provided on the outer contour of the plug receptacle part 7, so that the optical waveguide plug 20 can be reliably fixed to the module 10.

The optical waveguide plug 20, which is likewise illustrated diagramatically in a simplified manner, is part of an optical waveguide cable having an interior in which an optical waveguide 26 is arranged. The end area of the optical waveguide 26 is flush with a bottom area of the sleeve-like plug section 27, and thus lies in the interior of the optical waveguide plug 20. This affords maximum protection for the optical end area of the optical waveguide 26. The present invention nevertheless ensures that, in the plugged-together state of the module 10 and the optical waveguide plug 20, the end areas of the optical waveguide piece 6 and of the optical waveguide 26 are directly opposite one another and are thus optically coupled to one another. In the state when the optical waveguide plug 20 is not being used, the opening of the sleeve-like plug section 27 may additionally be closed off by suitable elements that are fixed to the plug. This additionally protects the optical end area of the optical waveguide 26 against ambient influences.

Figure 2A:
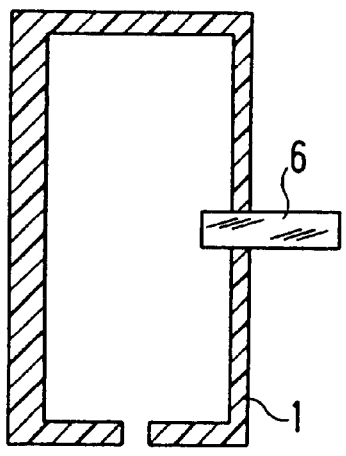
FIGS. 2A and 2B show a first embodiment of a method for producing a transmitting and/or receiving module.
Figure 2B:
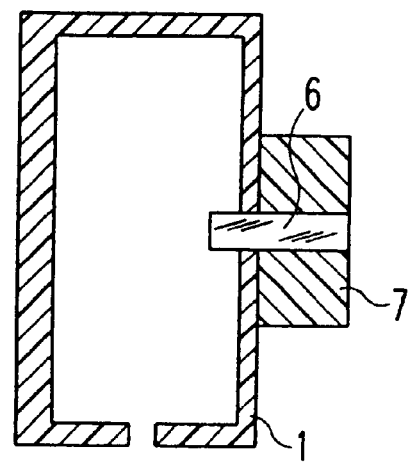
Figure 3:
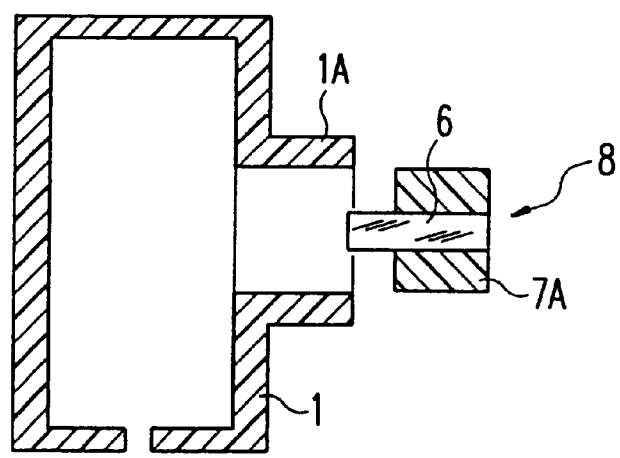
FIG. 3 shows a second embodiment of a method for producing a transmitting and/or receiving module.

For producing and fixing the plug receptacle part 7 and the optical waveguide piece 6 on the module housing 1, it is possible to use two fundamentally different method variants as shown in FIGS. 2A, 2B and 3, which are explained below.

In accordance with FIG. 2A, a module housing 1, for example made of plastic, is produced and provided with two housing openings. A separately fabricated optical waveguide piece 6 is introduced into a lateral housing opening in such a way that it projects into the interior of the module housing 1 and projects from the module housing 1 in each case by predetermined lengths. A bottom opening in the module housing 1 is provided for introducing a lead frame into the module housing 1 in a later method step and for subsequently filling the interior of the module housing 1 with a transparent potting material.

In the next method step, in accordance with FIG. 2B, a plug receptacle part 7 is moulded onto that section of the optical waveguide piece 6 which projects from the module housing 1. The plug receptacle part 7 may be injection-moulded from plastic, for example. Afterwards, in order to produce the module in accordance with FIG. 1, a lead frame 3 equipped with an electro-optical transducer 5 can be introduced into the module housing 1 through the bottom opening in the module housing 1, and if appropriate, with the assistance of a suitable positioning device, can be brought into an end position in which the electro-optical transducer 5 is situated directly opposite, and at a short distance away from the transducer-side end area of the optical waveguide piece 6. The transparent potting material is then filled in through the bottom opening in the module housing 1.

In the case of the method variant shown in FIG. 3, first a module housing 1 is produced, in which a lateral opening with a relatively large internal diameter and a sleeve-like extension 1A attached to the opening edges is moulded on. Such a housing design is already known per se. The sleeve-like extension 1A is used as a plug receptacle. In the present case, however, a closure moulded piece 8 is formed separately in such a way that a section of the length of an optical waveguide piece 6 is surrounded by an annular moulded-on portion 7A. After it has been completed, this closure moulded piece 8 is introduced into the opening of the sleeve-like extension 1A, so that it closes this opening in a positively locking manner. For this purpose, the closure moulded piece 8 has, in the region of the annular moulded-on portion 7A, an external diameter which is slightly smaller than the internal diameter of the sleeve-like extension 1A. The annular moulded-on portion 7A can be injection-moulded from plastic, for example, onto the optical waveguide piece 6. The completed closure moulded piece 8 is then introduced with the uncovered section of the optical waveguide piece 6 at the front into the sleeve-like extension 1A and into the housing opening and is fixed in a suitable manner in a position in which the optical waveguide piece 6 projects into the interior of the module housing 1. Afterwards, as in the first method variant, a lead frame 3 equipped with an electro-optical transducer 5 is introduced through the bottom housing opening and brought into defined end position and the interior of the module housing is filled with the transparent potting material.

We claim:

1. An optical module, comprising:

a lead frame having an end section;

an electro-optical transducer mounted on said end section of said lead frame;

a module housing formed with an outer housing wall, an inner cavity defining sides, a first housing opening leading to said cavity, and a second housing opening leading to said cavity, said end section of said lead frame projecting through said first housing opening, said second housing opening being for passage of an optical radiation beam, said beam being selected from a group consisting of an optical transmitting radiation beam from said electo-optical transducer and a received radiation beam by said electo-optical transducer;

a plug receptacle part extending outwards near said second housing opening, said plug receptacle part being configured on said outer housing wall;

a transparent potting compound; and an optical waveguide piece being optically coupled to said electro-optical transducer;

said module housing being moulded in one piece and enclosing said cavity on all of said sides of said cavity;

said cavity being completely filled with said transparent potting compound;

said plug receptacle part having only one edge section fixed to said housing, said edge section running around said second housing opening and lying in a common plane with said second housing opening;

said plug receptacle part formed with an interior and an outer end area; and said optical waveguide piece extending, from said outer end area of said plug receptacle part, through said interior of said plug receptacle part and through said second housing opening into said interior of said module housing.

2. The module according to claim 1, wherein: said plug receptacle part is not formed in one piece with said module housing.

3. The module according to claim 1, wherein: said plug receptacle part forms a sleeve-like extension moulded in one piece with said module housing.

4. An optical waveguide plug, in combination with the optical module according to claim 1, wherein:

said plug receptacle part of the optical module has an outer contour;

said optical waveguide piece of the optical module has a plug-side end area; and the optical waveguide plug includes:

a sleeve-shaped plug section having an inner contour corresponding to said outer contour of said plug receptacle part of the optical module; and an optical waveguide having an end area being optically coupled to said plug-side end area of said optical waveguide piece when in a plugged-together state.

5. A method for producing an optical transmitting and/or receiving module, which comprises:

moulding a housing opening into a module housing and moulding an extension projecting outwards, in a manner selected from a group consisting of a tubular manner and a sleeve-shaped manner, onto an edge of the housing opening, the extension having a defined internal diameter;

forming a closure moulded piece with an annular moulded-on portion surrounding a portion of a length of an optical waveguide piece, and forming the annular moulded-on portion with an external diameter that is slightly smaller than the internal diameter of the extension;

configuring the closure moulded piece such that a transducer-side end of an uncovered section of the optical waveguide piece is at a front end of the closure moulded piece;

introducing the front end of the closure moulded piece with the uncovered section of the optical waveguide piece into the sleeve-shaped extension and the housing opening;

fixing the closure moulded piece in a position in which the optical waveguide piece projects into an interior of the module housing;

providing a lead frame on which an electro-optical transducer is mounted;

introducing the lead frame into the interior of the module housing and positioning the electro-optical transducer such that the electro-optical transducer is optically coupled to the transducer-side end of the optical waveguide piece; and filling the interior of the module housing with a transparent potting compound.

6. The method according to claim 5, wherein: the annular moulded-on portion is injection-moulded from plastic.

* * * * *